US010669965B2

(12) United States Patent
Braun et al.

(10) Patent No.: US 10,669,965 B2
(45) Date of Patent: Jun. 2, 2020

(54) METHOD FOR AN INTERNAL COMBUSTION ENGINE (71) Applicant: Continental Automotive GmbH, Hannover (DE)

(72) Inventors: Tobias Braun, Undorf (DE); Josef Kainz, Salching (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 42 days.

(21) Appl. No.: 16/064,842

(22) PCT Filed: Nov. 24, 2016

(86) PCT No.: PCT/EP2016/078738
§ 371 (c)(1),
(2) Date: Jun. 21, 2018

(87) PCT Pub. No.: WO2017/108323
PCT Pub. Date: Jun. 29, 2017

(65) Prior Publication Data
US 2019/0003413 A1    Jan. 3, 2019

(30) Foreign Application Priority Data
Dec. 22, 2015  (DE) .................. 10 2015 226 461

(51) Int. Cl.
*F02D 41/34*  (2006.01)
*F02D 41/24*  (2006.01)

(52) U.S. Cl.
CPC .......... *F02D 41/34* (2013.01); *F02D 41/2422* (2013.01); *F02D 2200/021* (2013.01);
(Continued)

(58) Field of Classification Search
CPC ............... F02D 41/34; F02D 2200/101; F02D 2200/0618; F02D 2200/0616;
(Continued)

(56) References Cited

U.S. PATENT DOCUMENTS 6,088,647 A    7/2000   Hemberger et al. .......... 701/104
6,276,341 B1   8/2001   Takahashi et al. ........... 123/492
(Continued)

FOREIGN PATENT DOCUMENTS

DE   19740608 A1   3/1999   ............. F02D 41/00
DE   19958932 A1   8/2000   ............. F02D 13/02
(Continued)

OTHER PUBLICATIONS

German Office Action, Application No. 102015226461.0, 9 pages, dated Mar. 22, 2016.
(Continued)

*Primary Examiner* — Joseph J Dallo
(74) *Attorney, Agent, or Firm* — Slayden Grubert Beard PLLC (57) ABSTRACT Various embodiments may include a method for operating an internal combustion engine comprising: measuring pressure oscillations assignable to a cylinder in the inlet tract at a defined operating point during normal operation; generating a corresponding pressure signal; determining a corresponding crankshaft phase angle; calculating an injection signal component caused by fuel injection by subtracting a reference base pressure oscillation signal; determining a signal phase position and a signal amplitude of the injection signal component; determining an injection start time; determining an injection quantity on the basis of the signal amplitude and reference amplitudes; and adapting operation of the internal combustion engine based on the determined injection quantity.

11 Claims, 2 Drawing Sheets (52) U.S. Cl.
CPC .............. *F02D 2200/0414* (2013.01); *F02D 2200/0616* (2013.01); *F02D 2200/0618* (2013.01); *F02D 2200/101* (2013.01); *Y02T 10/44* (2013.01)

(58) Field of Classification Search
CPC ....... F02D 2200/0414; F02D 2200/021; F02D 41/2422; Y02T 10/44
See application file for complete search history.

(56) References Cited

U.S. PATENT DOCUMENTS

| | | | |
|---|---|---|---|
| 6,311,669 B1 | 11/2001 | Przymusinski et al. ...... 123/300 | |
| 2003/0062028 A1 | 4/2003 | Kitagawa et al. ............ 123/486 | |
| 2005/0098146 A1 | 5/2005 | Lee ................................ 123/305 | |
| 2005/0245349 A1* | 11/2005 | Tabata ..................... B60K 6/38 | 477/3 |
| 2008/0211345 A1* | 9/2008 | Hauser ................ F02D 41/2096 | 310/316.03 |
| 2008/0253491 A1* | 10/2008 | Keezer ...................... G06F 1/04 | 375/371 |
| 2010/0228465 A1* | 9/2010 | Itabashi ................ F02D 41/021 | 701/104 |
| 2011/0125388 A1* | 5/2011 | Catanese ............... F02D 35/028 | 701/103 |
| 2012/0174896 A1* | 7/2012 | Kuchler .............. F02D 41/2096 | 123/494 |
| 2014/0347670 A1* | 11/2014 | Wortge .............. G01B 9/02023 | 356/477 |
| 2015/0219053 A1* | 8/2015 | Bollinger .............. F02D 41/123 | 73/114.48 |
| 2016/0017837 A1* | 1/2016 | Carey ................... F02D 41/402 | 123/480 |
| 2016/0280363 A1* | 9/2016 | Heverly, II ........... B64C 27/001 | |
| 2017/0198649 A1* | 7/2017 | Kainz ................. F02D 13/0207 | |
| 2017/0211497 A1* | 7/2017 | Nakagawa .............. F02D 45/00 | |
| 2017/0211501 A1* | 7/2017 | Tachibana ........... F02D 41/3094 | |
| 2018/0216565 A1* | 8/2018 | Suda .................. F02M 63/0295 | |

FOREIGN PATENT DOCUMENTS

| | | | |
|---|---|---|---|
| DE | 10309720 A1 | 9/2004 | ............ F02D 41/38 |
| DE | 102007060768 A1 | 6/2009 | ............ F02D 41/00 |
| DE | 102008002216 A1 | 10/2009 | ............ F02M 63/00 |
| DE | 102015209665 A1 | 12/2015 | ............ F02D 41/00 |
| EP | 0621405 A1 | 10/1994 | ............ F02D 33/00 |
| JP | 09112320 A | 4/1997 | ............ F02D 13/02 |
| KR | 20040057443 A | 7/2004 | ............ F02D 41/40 |
| WO | 99/47802 A1 | 9/1999 | ............ F02D 41/38 |
| WO | 2017/108323 A1 | 6/2017 | ............ F02D 41/34 |

OTHER PUBLICATIONS

International Search Report and Written Opinion, Application No. PCT/EP2016/078738, 21 pages, dated Mar. 20, 2017.

* cited by examiner

Fig. 1

METHOD FOR AN INTERNAL COMBUSTION ENGINE

CROSS-REFERENCE TO RELATED APPLICATIONS

This application is a U.S. National Stage Application of International Application No. PCT/EP2016/078738 filed Nov. 24, 2016, which designates the United States of America, and claims priority to DE Patent Application No. 10 2015 226 461.0 filed Dec. 22, 2015, the contents of which are hereby incorporated by reference in their entirety.

TECHNICAL FIELD

The present disclosure relates to internal combustion engines. Various embodiments may include a method for determining the injection start time and the injection quantity of the fuel of an internal combustion engine from the intake pipe pressure signal during the normal operation of the internal combustion engine.

BACKGROUND

Reciprocating-piston internal combustion engines, which will in this context and hereinafter also be referred to in shortened form merely as internal combustion engines, have one or more cylinders in which a reciprocating piston is arranged. To illustrate the principle of a reciprocating-piston internal combustion engine, reference will be made below to FIG. 1, which illustrates by way of example a cylinder of a prior art internal combustion engine, which is possibly also a multi-cylinder internal combustion engine, together with the most important functional units.

Figure 1:
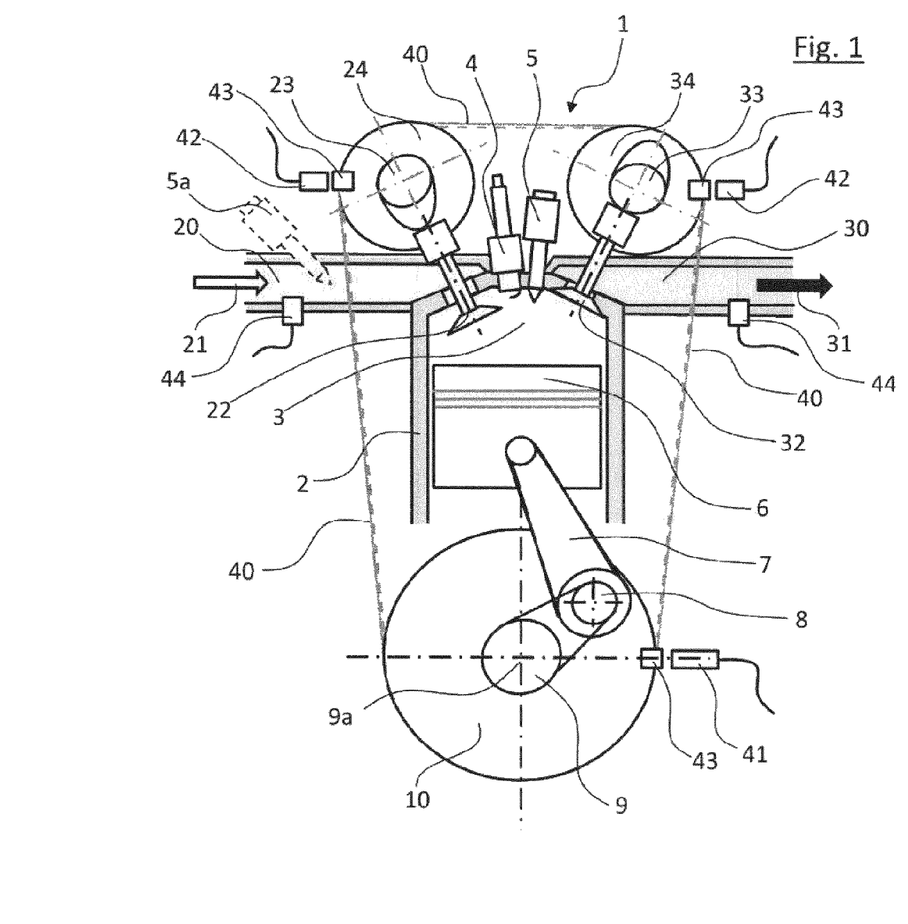
FIG. 1 is a simplified illustration of a reciprocating-piston internal combustion engine, referred to here in shortened form as internal combustion engine, with the most important functional components.

The respective reciprocating piston 6 is arranged in linearly movable fashion in the respective cylinder 2 and, together with the cylinder 2, encloses a combustion chamber 3. The respective reciprocating piston 6 is connected by means of a so-called connecting rod 7 to a respective crankpin 8 of a crankshaft 9, wherein the crankpin 8 is arranged eccentrically with respect to the crankshaft axis of rotation 9a. As a result of the combustion of a fuel-air mixture in the combustion chamber 3, the reciprocating piston 6 is driven linearly "downward". The translational stroke movement of the reciprocating piston 6 is transmitted by means of the connecting rod 7 and crankpin 8 to the crankshaft 9 and is converted into a rotational movement of the crankshaft 9, which causes the reciprocating piston 6, owing to its inertia, after it passes through a bottom dead center in the cylinder 2, to be moved "upward" again in the opposite direction as far as a top dead center.

To permit continuous operation of the internal combustion engine 1, during a so-called working cycle of a cylinder 2, it is necessary firstly for the combustion chamber 3 to be filled with the fuel-air mixture, for the fuel-air mixture to be compressed in the combustion chamber 3 and to then be ignited (by means of an ignition plug in the case of a gasoline internal combustion engine and by ultra-ignition in the case of a diesel internal combustion engine) and burned in order to drive the reciprocating piston 6, and finally for the exhaust gas that remains after the combustion to be discharged from the combustion chamber 3. Continuous repetition of this sequence results in continuous operation of the internal combustion engine 1, with work being output in a manner proportional to the combustion energy.

Depending on the engine concept, a working cycle of the cylinder 2 is divided into two strokes distributed over one crankshaft rotation (360°) (two-stroke engine) or into four strokes distributed over two crankshaft rotations (720°) (four-stroke engine). To date, the four-stroke engine has become established as a drive for motor vehicles. In an intake stroke, with a downward movement of the reciprocating piston 6, fuel-air mixture 21 (in the case of intake pipe injection by means of injection valve 5a, illustrated as an alternative in FIG. 1 by means of dashed lines) or else only fresh air (in the case of fuel direct injection by means of injection valve 5) is introduced from the air intake tract 20 into the combustion chamber 3.

During the following compression stroke, with an upward movement of the reciprocating piston 6, the fuel-air mixture or the fresh air is compressed in the combustion chamber 3, and if appropriate fuel is separately injected by means of an injection valve 5. During the following working stroke, the fuel-air mixture, for example in the case of the gasoline internal combustion engine, is ignited by means of an ignition plug 4, burns and expands, outputting work, with a downward movement of the reciprocating piston 6. Finally, in an exhaust stroke, with another upward movement of the reciprocating piston 6, the remaining exhaust gas 31 is discharged out of the combustion chamber 3 into the exhaust-gas tract 30.

The delimitation of the combustion chamber 3 with respect to the intake tract 20 or exhaust-gas tract 30 of the internal combustion engine is realized generally, and in particular in the example taken as a basis here, by means of inlet valves 22 and outlet valves 32. In the current prior art, said valves are actuated by means of at least one camshaft. The example shown has an inlet camshaft 23 for actuating the inlet valves 22 and has an outlet camshaft 33 for actuating the outlet valves 32. There are normally yet further mechanical components (not illustrated here) for force transmission provided between the valves and the respective camshaft, which components may also include a valve play compensation means (e.g. bucket tappet, rocker lever, finger-type rocker, tappet rod, hydraulic tappet etc.).

The inlet camshaft 23 and the outlet camshaft 33 are driven by means of the internal combustion engine 1 itself. For this purpose, the inlet camshaft 23 and the outlet camshaft 33, in each case by means of suitable inlet camshaft control adapters 24 and outlet camshaft control adapters 34, such as for example toothed gears, sprockets or belt pulleys, and with the aid of a control mechanism 40, which has for example a toothed gear mechanism, a control chain or a toothed control belt, are coupled, in a predefined position with respect to one another and with respect to the crankshaft 9 by means of a corresponding crankshaft control adapter 10, which is correspondingly formed as a toothed gear, sprocket or belt pulley, to the crankshaft 9. By means of this connection, the rotational position of the inlet camshaft 23 and of the outlet camshaft 33 in relation to the rotational position of the crankshaft 9 is, in principle, defined. By way of example, FIG. 1 illustrates the coupling between inlet camshaft 23 and the outlet camshaft 33 and the crankshaft 9 by means of belt pulleys and a toothed control belt.

The rotational angle covered by the crankshaft during one working cycle will hereinafter be referred to as working phase or simply as phase. A rotational angle covered by the crankshaft within one working phase is accordingly referred to as phase angle. The respectively current crankshaft phase angle of the crankshaft 9 can be detected continuously by means of a position encoder 43 connected to the crankshaft 9, or to the crankshaft control adapter 10, and an associated crankshaft position sensor 41. Here, the position encoder 43 may be formed for example as a toothed gear with a multiplicity of teeth arranged so as to be distributed equidistantly over the circumference, wherein the number of individual teeth determines the resolution of the crankshaft phase angle signal.

It is likewise additionally possible, if appropriate, for the present phase angles of the inlet camshaft 23 and of the outlet camshaft 33 to be detected continuously by means of corresponding position encoders 43 and associated camshaft position sensors 42. Since, owing to the predefined mechanical coupling, the respective crankpin 8, and with the latter the reciprocating piston 6, the inlet camshaft 23, and with the latter the respective inlet valve 22, and the outlet camshaft 33, and with the latter the respective outlet valve 32, move in a predefined relationship with respect to one another and in a manner dependent on the crankshaft rotation, said functional components run through the respective working phase synchronously with respect to the crankshaft.

The respective rotational positions and stroke positions of reciprocating piston 6, inlet valves 22 and outlet valves 32 can thus, taking into consideration the respective transmission ratios, be set in relation to the crankshaft phase angle of the crankshaft 9 predefined by the crankshaft position sensor 41. In an ideal internal combustion engine, it is thus possible for every particular crankshaft phase angle to be assigned a particular crankpin angle, a particular piston stroke, a particular inlet camshaft angle and thus a particular inlet valve stroke and also a particular outlet camshaft angle and thus a particular outlet camshaft stroke. That is to say, all of the stated components are, or move, in phase with the rotating crankshaft 9.

In modern internal combustion engines 1, there may be additional positioning elements within the mechanical coupling path between crankshaft 9 and inlet camshaft 23 and the outlet camshaft 33, for example in a manner integrated into the inlet camshaft adapter 24 and the outlet camshaft adapter 34, which positioning elements effect a desired controllable phase shift between the crankshaft 9 and inlet camshaft 23 and the outlet camshaft 33. These are known as so-called phase adjusters in so-called variable valve drives.

For optimum operation of the internal combustion engine (with regard to emissions, consumption, power, running smoothness, etc.), all operating variables relevant for efficient combustion of the fuel should be predefined and maintained as accurately as possible. The prior art for determining the operating variables is to measure a so-called reference internal combustion engine in all occurring operating states (engine speed, load, actuation of all actuators, different valve strokes, actuation of flaps, actuation of the phase adjusters for inlet and outlet valve, exhaust-gas turbocharger, compressor, etc.), and to store said measurement values (or derivatives thereof or model-based approaches which replicate the behavior) in corresponding characteristic maps in the engine control unit of a corresponding series-production internal combustion engine. All structurally identical, series-production internal combustion engines of the same type series are operated with this reference dataset that is generated. As a first approximation, the operating variables can thus be assumed as being known.

During the intended operation of a series internal combustion engine, however, component tolerances, wear phenomena, and/or environmental influences give rise to deviations of the actual operating variables from the operating variables sought on the basis of the reference data set. To counteract these deviations of the operating variables, it is necessary firstly to detect the actual operating variables and then perform adaptations in the reference data set or in the actuation for the purposes of a correction or approximation of the actual operating variables to the desired preset values.

Two important operating variables that consideration must be given to here are the injection start time and the obtained injection quantity of the fuel. Owing to tolerances in the injection valve itself (for example mechanical manufacturing tolerances) or in the electrical actuation thereof, deviations may arise between the desired and actual injection quantity of the fuel. Furthermore, deviations may arise between the desired injection start time and the actual injection start time of the injection. A quantity deviation leads to an impairment of the untreated emissions of the exhaust gas and thus possibly to a deterioration of the emissions of the overall system. An undesired shift of the injection time can, owing to the impairment of the mixture preparation, likewise lead to an impairment of the emissions.

It is therefore sought to detect the actual injection quantities and the injection start time as accurately as possible, to identify occurring deviations from the setpoint values (for example owing to tolerances), and to realize a corrective action by means of the adaptation of the actuation. Owing to ever-higher injection pressures, more complex injection valves and ever more stringent emissions requirements, this topic is of ever-increasing significance. In the case of the injection quantity and the injection start time, however, a direct detection/measurement of the present operating variables is not possible or can be determined only by indirect means. In the prior art, for this purpose, methods are proposed which perform a determination of the injection quantity for example on the basis of the pressure drop in the fuel supply or on the basis of dynamic torque fluctuations or on the basis of measurement values measured by means of a lambda probe. For the determination of the injection start times, methods are for example proposed which determine the injection start time on the basis of back-measurements of the current or voltage signal on an electrically driven injector and an analysis of the measured signal. Owing to the long functional chains, however, such methods are highly complex, susceptible to errors and inaccurate.

SUMMARY

The teachings of the present disclosure include a method with which, as far as possible without an additional sensor arrangement and outlay in terms of apparatus, the injection quantity and the injection start time can be detected as accurately as possible in order to permit corresponding adaptations of the operating parameters for the optimization of the ongoing operation. For example, a method for determining the injection start time and the injection quantity of the fuel during the normal operation of an internal combustion engine may include:

dynamic pressure oscillations, assignable to a cylinder of the internal combustion engine, in the inlet tract of the respective internal combustion engine are measured at a defined operating point during intake-synchronous fuel injection during normal operation, and from these, a corresponding pressure oscillation signal is generated, and wherein, at the same time, a crankshaft phase angle signal is determined, and wherein, from the pressure oscillation signal, the injection signal component caused by the fuel injection is calculated by subtracting a reference base pressure oscillation signal, and wherein the signal phase position and the signal amplitude of the injection signal component in relation to the crankshaft phase angle signal are determined, and wherein the injection start time is determined on the basis of the determined signal phase position of the injection signal component taking into consideration reference phase positions, and wherein the injection quantity is determined on the basis of the determined signal amplitude of the injection signal component taking into consideration reference amplitudes.

In some embodiments, the reference base pressure oscillation signal is made available in stored form as a function of the crankshaft phase angle, the reference phase positions are made available in stored form as a function of the injection start time, and the reference amplitudes are made available in stored form as a function of the injection quantity, in reference value characteristic maps.

In some embodiments, the reference base pressure oscillation signal is made available in stored form as a function of the crankshaft phase angle and corresponding model functions, wherein the model functions replicate the relationship between reference phase positions and injection start time and reference amplitudes and injection quantity.

In some embodiments, the reference base pressure oscillation signal has been determined as a function of the crankshaft phase angle, the reference phase positions have been determined as a function of the injection start time, and the reference amplitudes have been determined as a function of the injection quantity, on a reference internal combustion engine prior to the normal operation.

In some embodiments, the model functions have been derived, prior to the normal operation, from the reference phase positions and the associated injection times and from the reference amplitudes and the associated injection quantities, and replicate the relationship between reference phase position and injection start time and reference amplitude and injection quantity.

In some embodiments, additionally, at least one of the further operating parameters: temperature of the intake medium in the intake tract, temperature of a coolant used for cooling the internal combustion engine, and/or engine speed of the internal combustion engine, is taken into consideration in the determination of injection time and injection quantity of the fuel. In some embodiments, the calculation of the injection signal component caused by the fuel injection and the determination of the signal phase position and of the signal amplitude of the injection signal component in relation to the crankshaft phase angle signal and also the determination of the injection start time and the injection quantity of the fuel during the normal operation of an internal combustion engine are performed by means of an electronic processing unit assigned to the internal combustion engine, wherein the reference base pressure oscillation signal and the reference value characteristic maps or the model functions are stored in at least one memory area of the electronic processing unit.

In some embodiments, the prior determination of the reference base pressure oscillation signal and of the reference phase positions and reference amplitudes of the injection signal component is characterized by the measurement of a reference internal combustion engine in a measurement mode at at least one defined operating point, wherein, for the determination of the reference base pressure oscillation signal, the dynamic pressure oscillations, assignable to a cylinder of the reference internal combustion engine, in the inlet tract are measured in relation to the crankshaft phase angle signal in the absence of fuel injection or in the case of direct fuel injection into a closed combustion chamber, and from these, a corresponding pressure oscillation signal is generated and is stored as a reference base pressure oscillation signal, wherein the dynamic pressure oscillations, assignable to a cylinder of the reference internal combustion engine, in the inlet tract are additionally measured in relation to the crankshaft phase angle signal in the case of intake-synchronous fuel injection and with variation of injection start time and injection quantity, and from these, a respectively corresponding reference pressure oscillation signal is generated, and wherein a reference injection signal component is calculated from the respective reference pressure oscillation signal by subtraction of the reference base pressure oscillation signal, wherein a respective reference phase position and a respective reference amplitude of the respective reference injection signal component are determined, and wherein the determined reference phase positions are stored as a function of the respective injection time, and the determined reference amplitudes are stored as a function of the respective injection quantity, in reference value characteristic maps.

In some embodiments, the dynamic pressure oscillations are measured by means of a series-production-type pressure sensor in the intake pipe.

In some embodiments, the crankshaft position feedback signal is determined by means of a toothed gear and a Hall sensor.

In some embodiments, the electronic processing unit is an engine control unit for controlling the internal combustion engine, and an adaptation of the control variables or control routines for controlling the injection start time and the injection quantity of the fuel is performed by the engine control unit, as a function of the determined injection start time and the determined injection quantity, such that an approximation to predefined setpoint values for injection start time and injection quantity of the fuel is realized.

BRIEF DESCRIPTION OF THE DRAWINGS

To explain the functioning of an internal combustion engine and the signal profiles of the pressure oscillation signal as a basis for the functioning of the methods described herein, reference is made to the figures. In the figures.

DETAILED DESCRIPTION

In some embodiments, dynamic pressure oscillations, assignable to a cylinder of the internal combustion engine, in the inlet tract of the respective internal combustion engine are measured at a defined operating point during intake-synchronous fuel injection during normal operation, and from these, a corresponding pressure oscillation signal is generated. At the same time, a crankshaft phase angle signal is determined. From the pressure oscillation signal, the injection signal component caused by the fuel injection is calculated by subtracting a reference base pressure oscillation signal, and, based on this, the signal phase position and the signal amplitude of the injection signal component in relation to the crankshaft phase angle signal are determined.

Subsequently, the injection start time is then determined on the basis of the determined signal phase position of the injection signal component taking into consideration reference phase positions, and the injection quantity is determined on the basis of the determined signal amplitude of the injection signal component taking into consideration reference amplitudes. Assuming an intake-synchronous fuel injection, there is a unique relationship between the profile of the intake pipe pressure oscillation signal and the injection start time and also the injection quantity of the fuel in the inlet tract of the internal combustion engine.

In some embodiments, the dynamic pressure oscillations, assignable to a cylinder of the internal combustion engine, in the inlet tract of the respective internal combustion engine are measured at a defined operating point firstly during intake-synchronous fuel injection during normal operation, and from these, a corresponding pressure oscillation signal is generated. At the same time, a crankshaft phase angle signal of the internal combustion engine is determined, as a reference signal, as it were.

One possible operating point would for example be idle operation at a predefined rotational speed. Here, intake-synchronous injection is to be understood to mean injection in a time period during which, with the inlet valve open, fresh gas is fed into the combustion chamber. This may be realized by injection of the fuel into the intake pipe or directly into the combustion chamber of the respective cylinder with the inlet valve simultaneously open. Normal operation characterizes the intended operation of the internal combustion engine, for example in a motor vehicle, wherein the internal combustion engine is an example of a series of internal combustion engines of identical design. A further customary term for an internal combustion engine of said type, which will also be correspondingly used in this context, is series internal combustion engine.

In some embodiments, the pressure oscillation profile may be measured by means of a pressure sensor (which is generally provided in any case) in the intake pipe of the respective series internal combustion engine. By comparison of the measured pressure oscillation profile with a reference pressure oscillation profile (with known injection start time and known injection quantity) determined in advance on a reference internal combustion engine, the present injection start time and the present injection quantity on the series internal combustion engine can be determined.

The influence of the fuel injection on the dynamic pressure oscillations in the intake pipe is based on the following underlying physical processes:
The injected fuel evaporates and, in the process, extracts the evaporation heat necessary for this purpose from the fresh gas.
At the same time, the evaporated fuel displaces air. The cooling effect is however predominant in relation to the displacement, such that the gas situated in the combustion chamber or inlet duct assumes a reduced volume in relation to the state without fuel injection.
As a consequence, a follow-on flow of further air from the intake pipe can occur, which initially leads to a pressure reduction there. The following-on flow of air into the intake pipe ultimately gives rise to a pressure increase again.
Superposed on this described effect are pressure oscillations in the intake system, which are caused by the periodic intake processes of the various cylinders.

In some embodiments, a pressure oscillation signal measured in the intake pipe during operation is thus composed of a component which is independent of the fuel injection, and which in this context is referred to as a base pressure oscillation signal, and a component caused by the fuel injection, which in this context is referred to as injection signal component. The influence of the injection parameters of injection start time and injection quantity is thus manifest only in the profile of the injection signal component. Under the assumption that the base pressure oscillation signal is known, the injection signal component can be obtained from the measured pressure oscillation signal by subtracting the base pressure oscillation signal, and then analyzed in isolation.

Figure 2:
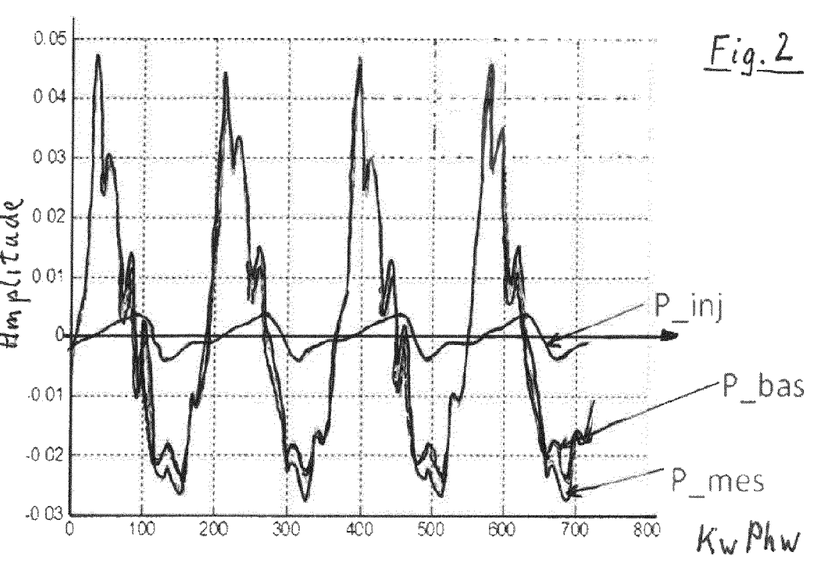
FIG. 2 shows a diagram illustrating the profiles of the signal components of the pressure oscillation signal.

This relationship is illustrated in FIG. 2 in a diagram. Plotted in the diagram are the pressure oscillation signal P_mes measured in the intake pipe and, with a small spacing thereto, the base pressure oscillation signal P_bas. Furthermore, the injection signal component P_inj obtained by subtraction of the base pressure oscillation signal P_bas from the pressure oscillation signal P_mes is illustrated in each case with the amplitude in relation to the crankshaft phase angle KwPhw.

The phase position, referred to hereinafter as a signal phase position, of the injection signal component P_inj in relation to the crankshaft phase angle is dependent on the injection start time, and the amplitude, hereinafter referred to as signal amplitude, of the injection signal component P_inj is dependent on the injection quantity of the fuel.

For the analysis of the injection signal component in relation to the phase position and the amplitude, said injection signal component can be subjected to a discrete Fourier transformation (DFT). For this purpose, an algorithm known as a fast Fourier transformation (FFT) may be used for the efficient calculation of the DFT. By means of DFT, the injection signal component is now broken down into individual signal frequencies which can thereafter be separately analyzed in simplified fashion with regard to their amplitude and the phase position.

In some embodiments, only those signal frequencies are used which correspond to the intake frequency, as base frequency or 1st harmonic, of the internal combustion engine or to a multiple of the intake frequency, that is to say the 2nd to n-th harmonic, wherein the intake frequency in turn has a unique relationship with the speed of the internal combustion engine. Then, for at least one selected signal frequency, taking into consideration the crankshaft phase angle signal detected in parallel, the phase position and the amplitude of said selected signal frequencies is determined in relation to the crankshaft phase angle.

Then, on the basis of the determined signal phase position, the injection start time is determined taking into consideration reference phase positions. For this purpose, reference phase positions determined in advance on a reference internal combustion engine of identical design are made available with associated injection start times. By means of the reference phase position that correlates with the determined signal phase position, the injection start time can then be inferred. Then, on the basis of the determined signal amplitude, the injection quantity is determined taking into consideration reference amplitudes. For this purpose, reference amplitudes determined in advance on a reference internal combustion engine of identical design are made available with associated injection quantities. By means of the reference amplitude that correlates with the determined signal amplitude, the injection quantity can then be inferred.

In some embodiments, the reference characteristic values determined in advance on a reference internal combustion engine of the series of internal combustion engines of identical design, the reference base pressure oscillation signal as a function of the crankshaft phase angle, the reference phase positions as a function of the injection start time, and the reference amplitudes as a function of the injection quantity, are stored, and made available for use in the method according to the invention, in reference value characteristic maps from which they can be accessed for comparison purposes.

The simplest form of such a characteristic map for the reference phase position consists in a diagram which, for a particular operating point of the internal combustion engine, replicates the dependency between the reference phase position and the respectively associated injection start time in the form of a reference phase position curve. The simplest form of such a characteristic map for the reference amplitudes consists in a diagram which, for a particular operating point of the internal combustion engine, replicates the dependency between the reference amplitude and the respectively associated injection quantity in the form of a reference amplitude curve.

A corresponding, more comprehensive characteristic map may for example comprise corresponding reference phase position curves or reference amplitude curves for different operating points of the internal combustion engine. The determination of the injection start time or of the injection quantity can in this example then be performed in a simple manner in that, proceeding from the signal phase position or signal amplitude determined during the normal operation of the internal combustion engine, the associated reference point on the reference phase position curve or on the reference amplitude curve is determined, and proceeding from this in turn, the associated injection start time or the associated injection quantity is determined.

In some embodiments, the reference base pressure oscillation signal may be made available in stored form as a function of the crankshaft phase angle and corresponding model functions which characterize the reference phase position curve and the reference amplitude curve, wherein the model functions replicate the relationship between reference phase positions and injection start time and reference amplitudes and injection quantity. With specification of the determined signal phase position or the determined signal amplitude, it is thus then possible for the up-to-date injection start time and injection quantity to each be calculated. The advantage of this alternative lies in the fact that, overall, less memory capacity has to be made available. In the implementation of the method, it is assumed that the reference base pressure oscillation signal, the reference phase positions for different injection start times and the reference amplitudes for different injection quantities are available for the implementation of the method.

In some embodiments, the reference base pressure oscillation signal is determined as a function of the crankshaft phase angle, the reference phase positions are determined as a function of the injection start time, and the reference amplitudes are determined as a function of the injection quantity, on a reference internal combustion engine prior to the normal operation. Here, the reference internal combustion engine is an internal combustion engine of identical design to the corresponding series of internal combustion engines, and in which, in particular, it is ensured that as far as possible no behavior-influencing structural tolerance deviations are present. It is thereby sought to ensure that the relationship between injection start time and reference phase position or injection quantity and reference amplitude is determined as accurately as possible and without the influence of further disturbance factors.

The determination of corresponding reference phase positions or reference amplitudes is possible by means of the reference internal combustion engine at different operating points and with presetting or variation of further operating parameters such as the temperature of the intake medium, the coolant temperature or the engine speed. The reference value characteristic maps thus generated can then advantageously be made available in all series internal combustion engines of identical design, in particular stored in a memory area of an electronic processing unit assignable to the internal combustion engine.

In some embodiments, determination of the reference phase positions and reference amplitudes, for example by means of corresponding polynomial approaches, may include in each case one model function to be derived from the determined reference phase positions or the determined reference amplitudes and the associated injection start times or injection quantities, which model function replicates at least the relationship between the reference phase positions and the injection start times or the reference amplitudes and the injection quantities. Here, it is optionally also possible for additional parameters, such as for example the temperature of the drawn-in medium in the intake tract, the temperature of a coolant used for cooling the internal combustion engine and the engine speed of the internal combustion engine to also be incorporated, which parameters, as will be discussed in more detail below, can be additionally taken into consideration in order to increase the accuracy of the method.

Accordingly, respective model functions are realized with which, with specification of the signal phase position or of the signal amplitude and possibly with incorporation of the abovementioned additional parameters, the respective up-to-date injection start time and injection quantity can be calculated. The model functions can then be made available in all series internal combustion engines of identical design, in particular stored in a memory area of an electronic processing unit assignable to the internal combustion engine. The advantages lie in the fact that the model functions require less memory space than comprehensive reference value characteristic maps.

In some embodiments, to further increase the accuracy of the determination of the composition of the fuel used, it is possible for additional operating parameters of the internal combustion engine to be taken into consideration in the determination of the fuel composition. For this purpose, at least one of the further operating parameters temperature of the intake medium in the intake tract,
temperature of a coolant used for cooling the internal combustion engine and
engine speed of the internal combustion engine, may be taken into consideration in the determination of the injection start time and the injection quantity.

The temperature of the drawn-in medium, that is to say substantially of the intake air, directly influences the speed of sound in the medium and thus the pressure propagation in the inlet tract. This temperature can be measured in the intake tract and is therefore known. The temperature of the coolant can also influence the speed of sound in the drawn-in medium owing to heat transfer in the inlet duct and in the cylinder. This temperature is generally also monitored and, for this purpose, measured, and is thus available in any case and can be taken into consideration in the determination of the fuel composition. The engine speed is one of the variables that characterizes the operating point of the internal combustion engine and influences the time available for the pressure propagation in the inlet duct. The engine speed is also constantly monitored and is thus available for the determination of the fuel composition.

The abovementioned additional parameters are thus available in any case or can be determined in a straightforward manner. The respective influence of the stated parameters on the pressure oscillation signal is in this case assumed to be known and has been determined for example during the measurement of a reference internal combustion engine and jointly stored in the reference value characteristic maps. The incorporation by means of corresponding correction factors or correction functions in the calculation of the injection start time and of the injection quantity by means of a model function also constitutes a possibility for taking these additional, further operating parameters into consideration in the determination of the fuel composition.

In some embodiments, the calculation of the injection signal component caused by the fuel injection and the determination of the signal phase position and of the signal amplitude of the injection signal component in relation to the crankshaft phase angle signal and also the determination of the injection start time and of the injection quantity of the fuel during the normal operation of an internal combustion engine are performed with the aid of an electronic processing unit assigned to the internal combustion engine, for example the central engine control unit (CPU) of the internal combustion engine, wherein the reference base pressure oscillation signal and the reference characteristic maps or the model functions are stored in at least one memory area of the electronic processing unit. In this way, the method according to the invention can be implemented automatically, very quickly and repeatedly during the operation of the series internal combustion engine.

In some embodiments, the prior determination of the reference base pressure oscillation signal and of the reference phase positions and reference amplitudes of the injection signal component may be performed by means of the measurement of a reference internal combustion engine at at least one defined operating point in a measurement mode. Here, for the determination of the reference base pressure oscillation signal, the dynamic pressure oscillations, assignable to a cylinder of the reference internal combustion engine, in the inlet tract are measured in relation to the crankshaft phase angle signal in the measurement mode in the absence of fuel injection or in the case of direct fuel injection into the closed combustion chamber, and from these, a corresponding pressure oscillation signal is generated and is stored as a reference base pressure oscillation signal, which is free from influences of the fuel injection.

Furthermore, dynamic pressure oscillations, assignable to a cylinder of the reference internal combustion engine, in the inlet tract are additionally measured in relation to the crankshaft phase angle signal in the case of intake-synchronous fuel injection and with variation of injection start time and injection quantity, and from these, a respectively corresponding reference pressure oscillation signal is generated. Subsequently, a reference injection signal component is calculated from the respective reference pressure oscillation signal by subtraction of the reference base pressure oscillation signal. On the basis of the reference injection signal component, a respective reference phase position and a respective reference amplitude of the respective reference injection signal component are determined, and the determined reference phase positions are stored as a function of the respective injection time, and the determined reference amplitudes are stored as a function of the respective injection quantity, in reference value characteristic maps.

This approach has the advantage that the under some circumstances very comprehensive, expensive measurements for the determination of reference-based pressure signal, reference phase positions and reference amplitudes only need to be performed once on the reference internal combustion engine and are then inexpensively available for every series internal combustion engine of identical design. The abovementioned approach may be repeated with variation of particular influencing operating parameters, for example at different operating points, in order to broaden the database and incorporate the influences of the further parameters. This facilitates the implementation of the method during operation, because in implementing the method, one is then possibly not reliant on exactly adhering to particular parameters.

Although using a reference base pressure oscillation signal determined on a reference internal combustion engine, the respective injection start time and the injection quantity can already be determined with good accuracy, comparison measurements on different series internal combustion engines have shown that engine-specific, tolerance-induced deviations of a respectively measured base pressure signal relative to the reference base pressure oscillation signal determined on the reference internal combustion engine exist, which can adversely affect the quality of the determination of injection start time and injection quantity.

In some embodiments, the reference base pressure signal may be determined prior to the normal operation on the respective series internal combustion engine, alternatively to the abovementioned determination on a reference internal combustion engine. This may be performed, as it were as a final step of the production process, by determination of a pressure oscillation signal in a measurement mode of the respective series internal combustion engine at the end of the production line (end of line). Here, the series internal combustion engine is measured at a particular operating point, in the absence of fuel injection or in the case of direct fuel injection into the closed combustion chamber, in relation to the crankshaft phase angle signal, and from this, a corresponding pressure oscillation signal is generated, which is stored as a reference base pressure oscillation signal. The reference base pressure oscillation signal thus determined contains, and thus takes into consideration, engine-specific deviations from the reference internal combustion engine, which permits an even more accurate determination of the injection signal component and, resulting therefrom, also a more accurate determination of signal phase position and injection start time and signal amplitude and injection quantity.

In some embodiments, the dynamic pressure oscillations in the intake tract may be measured by means of a series-production-type pressure sensor in the intake pipe. This has the advantage that no additional pressure sensor is required, which represents a cost advantage.

In some embodiments, the crankshaft position feedback signal may be determined by means of a toothed gear and a Hall sensor, wherein this is a customary sensor arrangement, which is possibly present in the internal combustion engine in any case, for detecting the crankshaft rotation. The toothed gear is in this case arranged for example on the outer circumference of a flywheel or of the crankshaft timing adapter 10 (see also FIG. 1). This has the advantage that no additional sensor arrangement is required, which represents a cost advantage.

In some embodiments, the electronic processing unit by means of which the method is implemented and on which the reference base pressure oscillation signal, the reference characteristic maps or the model function are stored, is an engine control unit (CPU) for controlling the internal combustion engine, and an adaptation of the control variables or control routines for controlling the injection start time and the injection quantity of the fuel is performed by the engine control unit, as a function of the determined injection start time and the determined injection quantity, such that an approximation to predefined setpoint values for injection start time and injection quantity of the fuel is realized. This firstly has the advantage that no separate electronic processing unit is required, and there are thus also no additional interfaces, which are possibly susceptible to failure, between multiple processing units. Secondly, the method according to the invention can thus be made an integral constituent part of the control routines of the internal combustion engine, whereby a fast adaptation of the control variables or control routines for the internal combustion engine is possible.

Summarized briefly once again, dynamic pressure oscillations, assignable to a cylinder of the internal combustion engine, in the inlet tract of the respective internal combustion engine are measured at a defined operating point during intake-synchronous fuel injection during normal operation, and from these, a pressure oscillation signal in relation to a simultaneously measured crankshaft phase angle signal is determined. From the pressure oscillation signal, the injection signal component caused by the fuel injection is calculated by subtracting a reference base pressure oscillation signal, and the signal phase position thereof and the signal amplitude thereof in relation to the crankshaft phase angle signal are determined. Subsequently, the injection start time is determined on the basis of the determined signal phase position of the injection signal component taking into consideration reference phase positions, and the injection quantity is determined on the basis of the determined signal amplitude of the injection signal component taking into consideration reference amplitudes. Then, operation of the internal combustion engine may be adapted to the determined quantity.

What is claimed is:

1. A method for operating an internal combustion engine, the method comprising:
    measuring dynamic pressure oscillations assignable to a cylinder of the internal combustion engine in the inlet tract of the internal combustion engine at a defined operating point during intake-synchronous fuel injection during normal operation;
    generating a corresponding pressure oscillation signal based on the measured oscillations;
    determining a corresponding crankshaft phase angle signal;
    calculating an injection signal component caused by fuel injection based at least in part on the pressure oscillation signal by subtracting a reference base pressure oscillation signal;
    wherein the reference base pressure oscillation signal includes pressure oscillation signal based on a measurement taken at the defined operating point without fuel injection or with direct fuel injection into a closed combustion chamber, and the reference base pressure oscillation signal depends on a function of the crankshaft phase angle signal;
    determining a signal phase position and a signal amplitude of the injection signal component in relation to the crankshaft phase angle signal;
    determining an injection start time at least in part on the basis of the determined signal phase position of the injection signal component and the reference phase positions;
    determining an injection quantity at least in part on the basis of the determined signal amplitude of the injection signal component and reference amplitudes; and
    adapting operation of the internal combustion engine based on the determined injection quantity.

2. The method as claimed in claim 1, wherein:
    the reference base pressure oscillation signal is stored as a function of the crankshaft phase angle;
    the reference phase positions are stored as a function of the injection start time; and
    the reference amplitudes are stored as a function of the injection quantity, in reference value characteristic maps.

3. The method as claimed in claim 1, wherein the reference base pressure oscillation signal is stored as a function of the crankshaft phase angle and corresponding model functions; and
    the model functions replicate the relationship between reference phase positions and injection start time and reference amplitudes and injection quantity.

4. The method as claimed in claim 1, wherein:
    the reference base pressure oscillation signal has been determined as a function of the crankshaft phase angle;
    the reference phase positions have been determined as a function of the injection start time; and
    the reference amplitudes have been determined as a function of the injection quantity;
    on a reference internal combustion engine prior to the normal operation.

5. The method as claimed in claim 3, wherein the model functions have been derived, prior to the normal operation, from the reference phase positions and the associated injection times and from the reference amplitudes and the associated injection quantities, and replicate the relationship between reference phase position and injection start time and reference amplitude and injection quantity.

6. The method as claimed in claim 1, further comprising accounting for at least one of the operating parameters selected from the group consisting of:
    temperature of the intake medium in the intake tract,
    temperature of a coolant used for cooling the internal combustion engine, and/or
    engine speed of the internal combustion engine,
    in the determination of injection time and injection quantity of the fuel.

7. The method as claimed in claim 2, wherein the calculation of the injection signal component caused by the fuel injection and the determination of the signal phase position and of the signal amplitude of the injection signal component in relation to the crankshaft phase angle signal and also the determination of the injection start time and the injection quantity of the fuel during the normal operation of an internal combustion engine are performed by means of an electronic processing unit assigned to the internal combustion engine,
    wherein the reference base pressure oscillation signal and the reference value characteristic maps or the model functions are stored in at least one memory area of the electronic processing unit.

8. The method as claimed in claim 4, wherein the prior determination of the reference base pressure oscillation signal and of the reference phase positions and reference amplitudes of the injection signal component is characterized by the measurement of a reference internal combustion engine in a measurement mode at at least one defined operating point,
    wherein, for the determination of the reference base pressure oscillation signal, the dynamic pressure oscillations, assignable to a cylinder of the reference internal combustion engine, in the inlet tract are measured in relation to the crankshaft phase angle signal in the absence of fuel injection or in the case of direct fuel injection into a closed combustion chamber, and from these, a corresponding pressure oscillation signal is generated and is stored as a reference base pressure oscillation signal, wherein the dynamic pressure oscillations, assignable to a cylinder of the reference internal combustion engine, in the inlet tract are additionally measured in relation to the crankshaft phase angle signal in the case of intake-synchronous fuel injection and with variation of injection start time and injection quantity, and from these, a respectively corresponding reference pressure oscillation signal is generated, and wherein a reference injection signal component is calculated from the respective reference pressure oscillation signal by subtraction of the reference base pressure oscillation signal, wherein a respective reference phase position and a respective reference amplitude of the respective reference injection signal component are determined, and wherein the determined reference phase positions are stored as a function of the respective injection time, and the determined reference amplitudes are stored as a function of the respective injection quantity, in reference value characteristic maps.

9. The method as claimed in claim 1, wherein the dynamic pressure oscillations are measured by means of a series-production-type pressure sensor in the intake pipe.

10. The method as claimed in claim 1, wherein the crankshaft position feedback signal is determined by means of a toothed gear and a Hall sensor.

11. The method as claimed in claim 7, wherein the electronic processing unit comprises an engine control unit for controlling the internal combustion engine, and an adaptation of the control variables or control routines for controlling the injection start time and the injection quantity of the fuel is performed by the engine control unit, as a function of the determined injection start time and the determined injection quantity, such that an approximation to predefined setpoint values for injection start time and injection quantity of the fuel is realized.

* * * * *